(12) United States Patent
Wang et al.

(10) Patent No.: US 9,300,713 B2
(45) Date of Patent: Mar. 29, 2016

(54) CLOCK SYNCHRONIZATION FOR MULTI-PROCESSOR/MULTI-CHIPSET SOLUTION

(71) Applicant: QUALCOMM Incorporated, San Diego, CA (US)

(72) Inventors: Min Wang, San Diego, CA (US); Tien-Hsin Lee, San Diego, CA (US); Shankar Genesh LakshmanaSwamy, Bangalore (IN); Andy Yu, San Diego, CA (US); Vikram Singh, Bangalore (IN); Sandeep Padubidri Ramamurthy, Bangalore (IN); Yau Mo Chan, San Diego, CA (US); Vasudev Sujir Nayak, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/262,994

(22) Filed: Apr. 28, 2014

(65) Prior Publication Data

US 2015/0049248 A1 Feb. 19, 2015

Related U.S. Application Data

(60) Provisional application No. 61/866,924, filed on Aug. 16, 2013.

(51) Int. Cl.
*H04L 29/06* (2006.01)
*H04N 5/04* (2006.01)
(Continued)

(52) U.S. Cl.
CPC ............... *H04L 65/602* (2013.01); *H04J 3/00* (2013.01); *H04L 65/607* (2013.01);
(Continued)

(58) Field of Classification Search
None
See application file for complete search history.

(56) References Cited

U.S. PATENT DOCUMENTS 6,975,363 B1 * 12/2005 Baldwin et al. ............... 348/512
7,664,057 B1    2/2010 Wu et al.
(Continued)

FOREIGN PATENT DOCUMENTS

EP          1610558 A2    12/2005
EP          2448265 A1     5/2012
WO    WO-2006126826 A1   11/2006

OTHER PUBLICATIONS

ISA/EPO, International Search Report and Written Opinion of the International Searching Authority, Int'l. App. No. PCT/US2014/049593, Nov. 11, 2014, European Patent Office, Rijswijk, NL, 12 pgs.

(Continued)

*Primary Examiner* — Michael Teitelbaum
(74) *Attorney, Agent, or Firm* — Holland & Hart LLP

(57) ABSTRACT

Methods, systems, and devices are described for media synchronization. Multi-stream media processes may include media streams captured with respect to different clock rates. Multi-processor implementations may involve separate clocks associated with different media streams, such as audio and video, respectively. The separate clocks may tend to drift from one another, becoming further out of sync as time passes. Selecting a reference time of one of the processors to function as a "wall clock," recording frame capture times with respect to the reference time, accounting for propagation delays, and transmitting frame capture times in terms of the reference time may aid in AV synchronization at a device where audio and video streams are received.

56 Claims, 10 Drawing Sheets

(51) Int. Cl.
   *H04J 3/00*      (2006.01)
   *H04N 21/6437*   (2011.01)
   *H04N 21/8547*   (2011.01)

(52) U.S. Cl.
   CPC ............ *H04L 65/608* (2013.01); *H04L 69/28* (2013.01); *H04N 5/04* (2013.01); *H04N 21/6437* (2013.01); *H04N 21/8547* (2013.01)

(56) References Cited

U.S. PATENT DOCUMENTS

| | | | |
|---|---|---|---|
| 2006/0123063 A1* | 6/2006 | Ryan et al. | 707/201 |
| 2006/0136768 A1* | 6/2006 | Liu et al. | 713/400 |
| 2008/0168294 A1 | 7/2008 | Batson et al. | |
| 2008/0168470 A1* | 7/2008 | Bushell et al. | 719/313 |
| 2008/0304573 A1 | 12/2008 | Moss et al. | |
| 2010/0296571 A1* | 11/2010 | El-Saban et al. | 375/240.01 |
| 2012/0127260 A1 | 5/2012 | Leclerc et al. | |
| 2012/0144056 A1 | 6/2012 | Stokking et al. | |
| 2012/0324520 A1 | 12/2012 | Van Deventer et al. | |
| 2013/0014200 A1 | 1/2013 | Stokking et al. | |

OTHER PUBLICATIONS

Rothermel, et al., "Clock Hierarchies: an Abstraction for Grouping and Controlling Media Streams," IEEE Journal on Selected Areas in Communications, Jan. 1996, pp. 174-184, vol. 14, No. 1, Institute of Electrical and Electronics Engineers.

IPEA/EPO, Second Written Opinion of the International Preliminary Examining Authority, Int'l. App. No. PCT/US2014/049593, Apr. 24, 2015, European Patent Office, Rijswijk, NL, 6 pgs.

* cited by examiner

CLOCK SYNCHRONIZATION FOR MULTI-PROCESSOR/MULTI-CHIPSET SOLUTION

CROSS REFERENCES

The present application for patent claims priority to U.S. Provisional Patent Application No. 61/866,924 by Wang et al., entitled "Audio/Video Clock Synchronization for Multi-Processor/Multichipset Solution," filed Aug. 16, 2013, assigned to the assignee hereof.

BACKGROUND

The following relates generally to media synchronization, and more specifically to audiovisual synchronization in wireless communications systems. Wireless communications systems are widely deployed to provide various types of communication content such as voice, video, video telephony, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Media synchronization, including audiovisual (also referred to as audio-video or AV) synchronization, is central to a positive user experience for services that have both audio and video components (e.g., video telephony (VT)). AV synchronization, which is also known as "lip sync," is generally defined as the process of ensuring that a relative delay between audio and video stream captures are maintained when they are viewed at some AV receiver. Relative delay being the time difference of an audio frame captured at a microphone and video captured at a camera.

Audio and video components are often transmitted in independent Real-time Transport Protocol (RTP) streams. These independent RTP streams may lead to poor synchronization of audio and video packets. Low production-quality movies provide limited AV synchronization. For example, the words of the soundtrack may not match the actor's apparent speech patterns. In some cases, it may appear as though the speaker is not actually saying the words attributed to her. Similarly poor AV synchronization may occur during real-time communication, such as VT phone calls.

SUMMARY

The described features generally relate to one or more improved systems, methods, and/or apparatuses for audiovisual synchronization. The described features may include tools and techniques to maintain synchronization of separate media RTP streams. At the receiver, media synchronization may be achieved by utilizing timing information extracted from the received RTP or RTP Control Protocol (RTCP) media streams. For example, timing information of media streams may be captured at the source—e.g., at or near a camera or microphone.

In some cases, initial RTP timestamps in each media stream (e.g., audio and video streams) are randomly set by a sender in order to fend off attacks on encryption. For example, initial RTP timestamps may be set according to the parameters set forth in the IETF Network Working Group Request for Comments (RFC) 3550. An RTCP sender report (SR) may provide for mapping of RTP timestamps of the individual RTP streams according to a common "wall clock." In such cases, the RTP timestamps may be used to determine a relative time separation between consecutive frames. Some AV synchronization examples require the RTP timestamps of the received audio and video RTP packets and/or the RTP timestamps and a Networking Protocol (NTP) timestamp of incoming audio and video RTCP SRs, where the NTP timestamp is the common "wall clock" time when an RTCP SR is sent.

Moreover, in many cases, including multi-processor AV implementations, an audio processing path may be different from a video processing path. For example, the audio processing path may include audio compression and an audio RTP stack, while the video processing path includes separate video compression and a separate video RTP stack. Such multi-processor implementations may involve separate clocks associated with audio and video, respectively; and the separate clocks may tend to drift from one another. That is, respective audio and video clock rates may tend to become further out of sync as time passes. In some cases, because the clock of one processor may be unable to read the clock of another processor, it may be impossible to sync the clocks to each other. It is therefore beneficial to select a reference time of one of the processors or clock rates to function as a "wall clock," and to transmit frame capture times (e.g., timestamps for each audio and video frame capture) of each processor with respect to the clock of one of the processors. Then media synchronization may be performed before displaying, for example, audio and video for a user.

In some embodiments, a method of media synchronization includes selecting a reference time at a first clock rate, mapping the reference time from the first clock rate to a second clock rate, recording a first timestamp of a first frame capture at the second clock rate, and determining a first capture time of the first frame capture based at least in part on the reference time and the first timestamp.

In some embodiments, a system for media synchronization includes means for selecting a reference time at a first clock rate, means for mapping the reference time from the first clock rate to a second clock rate, means for recording a first timestamp of a first frame capture at the second clock rate, and means for determining a first capture time of the first frame capture based at least in part on the reference time and the first timestamp.

In some embodiments, an apparatus for media synchronization includes a processor and memory in electronic communication with the processor. The memory may embody instructions executable by the processor to select a reference time at a first clock rate, map the reference time from the first clock rate to a second clock rate, record a first timestamp of a first frame capture at the second clock rate, and determine a first capture time of the first frame capture based at least in part on the reference time and the first timestamp.

In some embodiments, a computer-program product for media synchronization includes a non-transitory computer-readable medium storing instructions executable by a processor to select a reference time at a first clock rate, map the reference time from the first clock rate to a second clock rate, record a first timestamp of a first frame capture at the second clock rate, and determine a first capture time of the first frame capture based at least in part on the reference time and the first timestamp.

Various embodiments of the method, system, apparatus, and/or computer-program product described above may also include the features of, steps for, means for, and/or processor-executable instructions for adjusting the first capture time for a first propagation delay for mapping the reference time from the first clock rate to the second clock rate. In some embodiments, the first clock rate and the second clock rate are functions of a common processing unit. Alternatively, the first clock rate may be a function of a first processing unit and the second clock rate may be a function of a second processing unit. In some embodiments, the first processing unit and the second processing unit are each one of an audio processor or a video processor.

Various embodiments of the method, system, apparatus, and/or computer-program product described above may also include the features of, steps for, means for, and/or processor-executable instructions for mapping the reference time from the first clock rate to a third clock rate, recording a second timestamp of a second frame capture at the third clock rate, and determining a second capture time of the second frame capture based at least in part on the reference time and the second timestamp. Additionally or alternatively, embodiments may include features of, steps for, means for, and/or processor-executable instructions for adjusting the second capture time for a second propagation delay for mapping the reference time from the first clock rate to the third clock rate. The first clock rate, the second clock rate, and the third clock rate may be functions of a common processing unit. Alternatively, in some embodiments, the first clock rate is a function of a first processing unit, the second clock rate is a function of a second processing unit, and the third clock rate is a function of a third processing unit. For example, the first processing unit may be a modem and the second processing unit and the third processing unit may each be one of an audio processor or a video processor.

Various embodiments of the method, system, apparatus, and/or computer-program product described above may also include the features of, steps for, means for, and/or processor-executable instructions for updating the reference time periodically. Additionally or alternatively, embodiments may include the features of, steps for, means for, and/or processor-executable instructions for re-mapping the updated reference time after each reference time update.

Various embodiments of the method, system, apparatus, and/or computer-program product described above may also include the features of, steps for, means for, and/or processor-executable instructions for updating the reference time non-periodically. Additionally or alternatively, embodiments may include the features of, steps for, means for, and/or processor-executable instructions for re-mapping the updated reference time after each reference time update.

Some embodiments of the method, system, apparatus, and/or computer-program product described above may also include the features of, steps for, means for, and/or processor-executable instructions for transmitting the first capture time via a packet switched network. Additionally or alternatively, embodiments may include the features of, steps for, means for, and/or processor-executable instructions for utilizing the first capture time to perform audiovisual synchronization of a video display and an audio speaker.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Multi-stream media processes may include media streams captured with respect to different clock rates. For instance, multi-processor AV implementations may include different audio and video processing paths. The audio processing path may include audio compression and an audio RTP stack, while the video processing path includes separate video compression and a separate video RTP stack. Such multi-processor implementations may involve separate clocks associated with audio and video, respectively. The separate clocks may tend to drift from one another, becoming further out of sync as time passes. Selecting a reference time of one of the processors to function as a "wall clock," recording frame capture times with respect to the reference time, and transmitting frame capture times in terms of the reference time may aid in AV synchronization at a device where audio and video streams are received.

Figure 1A:
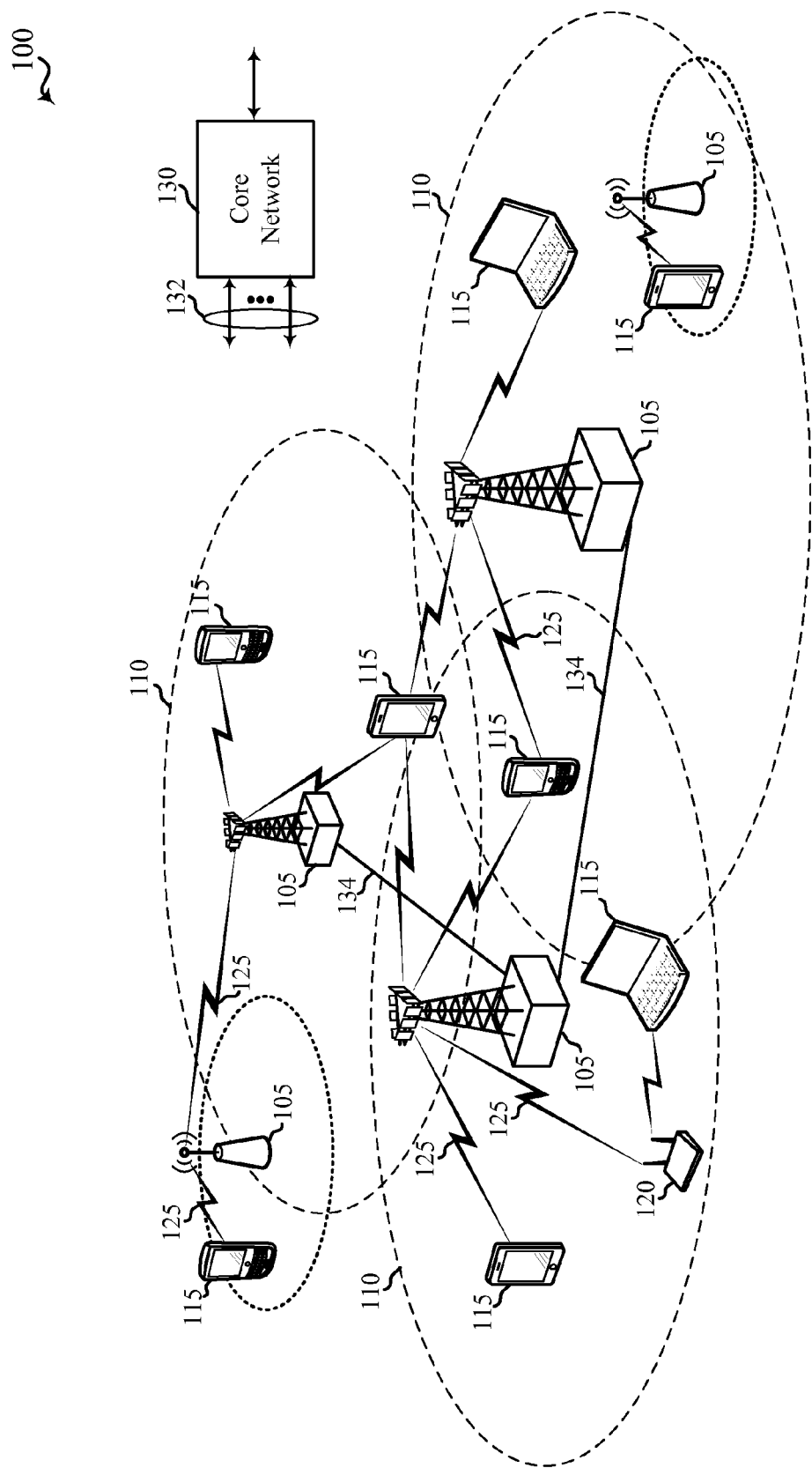
FIGS. 1A and 1B show diagrams of a wireless communications system or systems in accordance with some embodiments.

Video telephony (VT) calls and streaming media are often made over and/or associated with wireless communication systems. Referring first to FIG. 1A, a diagram illustrates an example of a wireless communications system 100. The system 100 includes base stations (or cells) 105, communication devices 115 and 120, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In some embodiments, the base stations 105 communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. Each communication link 125 may be a multi-carrier signal modulated according to the various radio technologies described above. Each modulated signal may be sent on a different carrier and may carry control information (e.g., reference signals, control channels, etc.), overhead information, data, etc.

In some cases, the base stations 105 wirelessly communicate with the devices 115 via one or more base station antennas. Each of the base station 105 sites may provide communication coverage for a respective geographic area 110. In some embodiments, base stations 105 are referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies. For example, the communications device 120 may be a WLAN router, such as a Wi-Fi router. The device 120 may be in communication with a device 115.

In some embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. Each eNB 105, for example, may provide communication coverage for a macro cell, a pico cell, a femto cell, and/or other types of cell(s).

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. Some of the UEs 115 may be connected with media-capture devices, such as cameras and microphones. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

In some embodiments, the transmission links 125 may provide for VT calls or videos streaming, or both, between two or more UEs 115. For example, one UE 115 may have a camera and a microphone respectively operating at different clock rates or operated by separate audio and video processors or processing units. During a VT call, a transmitting UE 115 may separately transmit audio and video streams, using RTP, to a receiving UE 115. The receiving UE 115 may need to sync the AV streams.

Figure 1B:
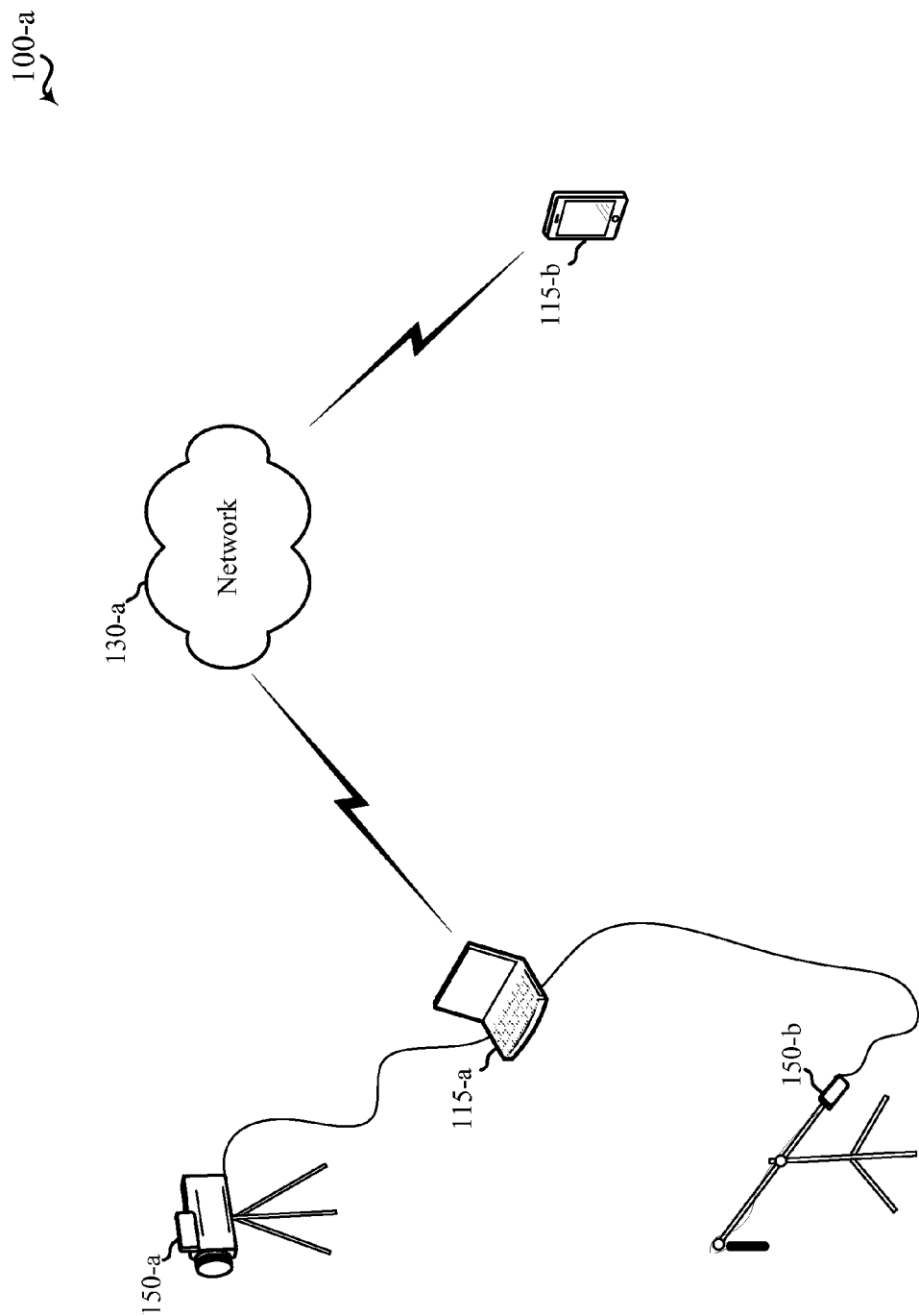

Turning next to FIG. 1B, shown is a system 100-a, which may be an example of one or more aspects of the system 100 of FIG. 1A. The system 100-a may include UEs 115-a and 115-b, which may be examples of UEs 115 of FIG. 1A. The system 100-a may also include a network 130-a, which may be an example of the network 130 of FIG. 1A. In some cases, the system 100-a includes media-capture, or AV, devices 150. For example, a camera 150-a and a microphone 150-b may be connected to the UE 115-a. The connection may be wired or wireless. In some cases, the AV devices 150 are integral to the UE 115-a. Additionally, in some embodiments, the UE 115-b is equipped with an onboard camera and microphone.

The UEs 115 may communicate with each other via the network 130-a by way of one or a number of wireless technologies discussed above. For example, the UE 115-a may communicate via a Wi-Fi connection to the network 130-a, which may communicate to the UE 115-b via LTE.

The AV devices 150 may each include separate processing units. For example, a microphone 150-b may include an audio processing unit with an encoder, an RTP stack, and a clock; and a camera 150-a may include a video processing unit with a separate encoder, RTP stack, and clock. Each AV device 150 may capture, respectively, audio and video frames. A reference time may be selected at a first clock rate and the reference time may be mapped from the first clock rate to a second clock rate. The first and second clock rates may be functions of a common processor, such as a processor associated with a UE 115; or the first and second clock rates may be functions of separate processing units. Thus, in some embodiments, a reference time is selected from the clock or clock rate of the audio processing unit at AV device 150-b. The reference time may be mapped to a second clock rate, which may be associated with a video processing unit at AV device 150-a. This mapping may be by way of the UE 115-a, which may be a computer.

A video frame capture of the camera 150-b may be timestamped based on the clock of the video processing unit. A video frame capture time may be determined based on the video timestamp and the reference time, which, as described more fully below, may be understood with respect to the audio processing unit. In some cases, there may be a propagation delay associated with mapping the reference time from one AV device 150 processing unit to another. A frame capture time may be adjusted to account for the propagation time.

Figure 2A:
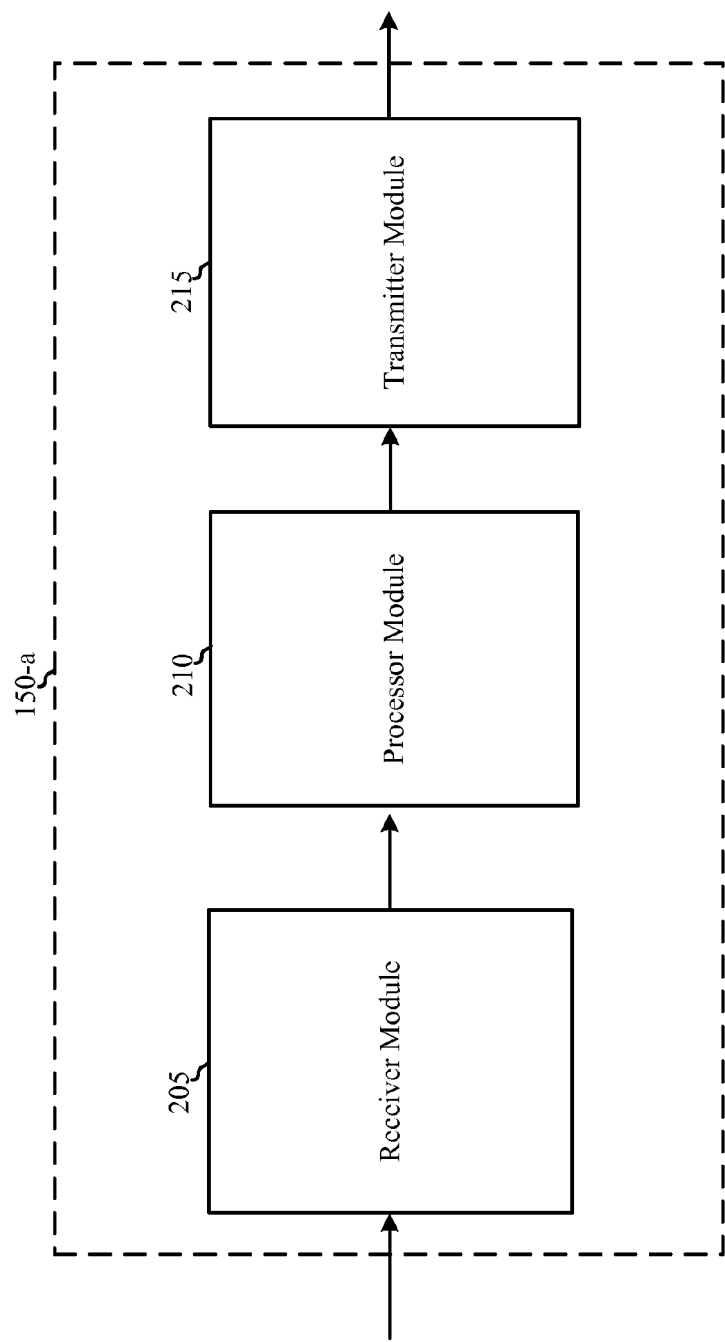
FIGS. 2A and 2B show block diagrams of an example device or devices in accordance with some embodiments.

Next, FIG. 2A shows a block diagram of an device 200 that may be configured for media synchronization in accordance with various embodiments. The device 200 may be an AV device 150-a, which may be an example of an AV device 150 described with reference to FIG. 1B. The device 200 may, additionally or alternatively, be an aspect of a UE 115 described with reference to FIGS. 1A and 1B. The device 200 may include a receiver module 205, a processor module 210, and/or a transmitter module 215. Each of the modules may be in communication with one another. The processor module 210 may be an AV device processing unit, such as an audio or video processing unit. For example, the device 200 may be an aspect of a camera or a microphone, and it may be configured to capture video or audio frames. In some embodiments, the device 200 is itself a processor, and the modules 205, 210, and 215 are aspects, or submodules, of the processor.

In some cases, a reference time is selected at a separate AV device (or AV processing unit) and mapped to the device 200. The mapped reference time may be received by the receiver module 205. The processor module 210 may be configured to capture an audio or video frame and it may record a timestamp of the frame capture. The timestamp may be a reading of a clock located at or within the processor module 210. Then, the processor module 210 may be configured to determine a capture time of the frame capture, in terms of the received reference time. For example, the capture time may be based on the reference time and recorded timestamp. The device 200 may be configured to transmit the captured frame and the determined capture time to a user via the transmitter module 215. If the process of mapping the reference time to the device 200 is associated with a propagation delay, the determined capture time may be adjusted accordingly. In some embodiments, the device 200 is a video processing unit associated with a camera; and the reference time is mapped from a separate audio processing unit associated with a microphone. But in other embodiments, the device 200 is an audio processing unit associated with a microphone.

In some cases, a reference time is updated and re-mapped from one device to another. By way of example, a reference time from an AV device (not shown) is periodically updated and re-mapped to the device 200 after each update. Alternatively, a reference time from another AV device (not shown) is updated in a non-periodic fashion—e.g., the reference time may be updated each time the device 200 is powered on, or at the direction of user. In either case, updating and re-mapping the reference time may prevent a clock associated with the processor module 210 from drifting with respect to a clock associated with the reference time.

In some embodiments, the components of the device 200 are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-custom integrated circuits (ICs)), which may be programmed in any manner known in the art. The functions of each unit also may be wholly or partially implemented with instructions embodied in a memory, formatted to be executed by one or more general or application specific processors.

Figure 2B:
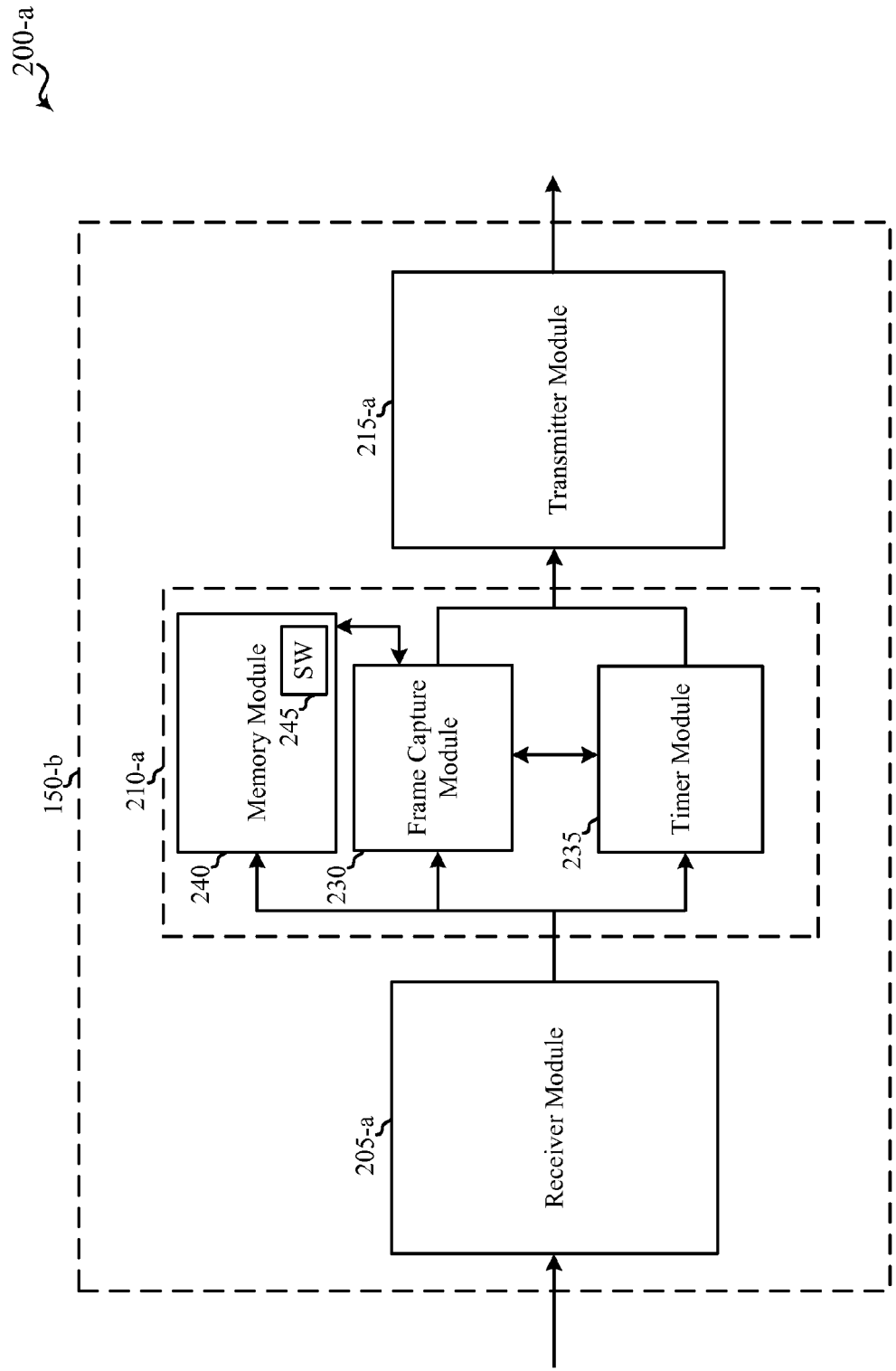

Turning next to FIG. 2B, a block diagram illustrates and example device configured for AV synchronization in accordance with various embodiments. The device 200-a may be an AV device 150-b, which may be an example of the AV devices 150 described with reference to FIGS. 1B and 2A. The device 200-a may also be an example of aspects of a UE 115 described with reference to FIGS. 1A and 1B. The device 200-a may include a receiver module 205-a, a processor module 210-a, and/or a transmitter module 215-a. These modules may be substantially the same as the corresponding modules of FIG. 2A. The processor module 210-a may include an intelligent hardware device, such as a central processing unit (CPU). In some cases, the processor module 210-a is an AV device processing unit. For example, the processor module 210-a may be an audio processing unit or a video processing unit. Each of the modules may be in communication with one another. In some embodiments, the device 200-a is itself a processor and the modules 205-a, 210-a, and/or 215-a are aspects, or submodules, of the processor.

The processor module 210-a may include a frame capture module 230 or a timer module 235, or both. For example, the frame capture module may be an audio frame capture module associated with a microphone, and it may capture frames of audio. Or the frame capture module may be a video frame capture module associated with a camera, and it may capture frames of video. In some embodiments, the timer module 235 is clock. The frame capture module 230 may timestamp a captured frame with the time of capture by reference to the timer module 235.

According to some embodiments, a reference time is selected at a first clock rate and mapped to the device 200-a. The first clock rate may be a function of a first processing unit, such as an AV processor, which is external to the device 200-a. Or the first clock rate may be a function of an additional timer (not shown) within the device 200-a. The first clock rate may be mapped to a second clock rate, which may be the clock rate of the timer module 235. The mapping may be by way of the receiver module 205-a. The frame capture module 230 may capture a frame and, with reference to the timer module 235, record a timestamp of the frame capture at the second clock rate. The frame capture module 230 may then determine a frame capture time based on the reference time and the timestamp. The determined frame capture time may then be transmitted via the transmitter module 215-a.

In some embodiments, the components of the device 200 are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-custom integrated circuits (ICs)), which may be programmed in any manner known in the art. The functions of each unit also may be wholly or partially implemented with instructions embodied in a memory, formatted to be executed by one or more general or application specific processors.

In some cases, the device 200-a includes a memory module 240. The memory module 240 may include random access memory (RAM) and/or read-only memory (ROM). In some embodiments, the memory module 240 also stores computer-readable, computer executable software (SW) code 245 containing instructions configured to, when executed, cause the processor module 210-a to perform various functions related to AV synchronization, as described herein. In other embodiments, the SW code 245 may not be directly executable by the processor module 210-a; but it may be configured to cause a computer, for example, when compiled and executed, to perform the functions described herein.

Figure 3:
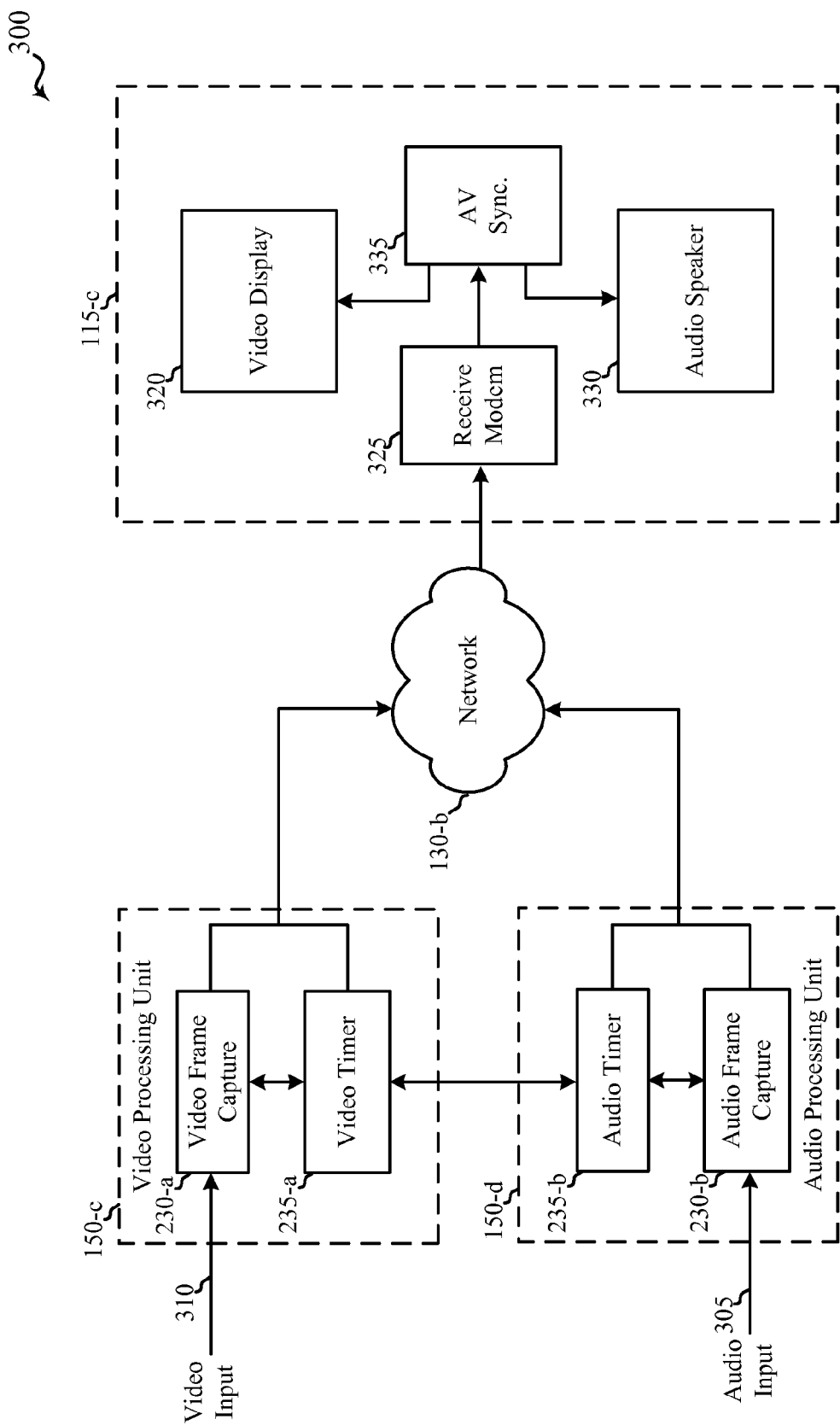
FIG. 3 shows a block diagram of an example communications system in accordance with some embodiments.

Now, referring to FIG. 3, a block diagram illustrates a system 300 configured for AV synchronization. The system 300 may be an example of aspects of the systems 100 and 100-a of FIGS. 1A and 1B. The system 300 may include aspects of the devices 200 and 200-a of FIGS. 2A and 2B. The system 300 may include a UE 115-c, a network 130-b, a video processing unit 150-c, and/or an audio processing unit 150-d. For example, the UE 115-c may be an example of the UEs 115 described with reference to FIGS. 1A, 1B, 2A, and/or 2B. The network 130-b may be an example of the network 130 described with reference to FIGS. 1A and 1B. The video processing unit 150-c and the audio processing unit 150-d may be examples of AV devices 150 described with reference to FIGS. 1B, 2A, and/or 2B.

The video processing unit 150-c may include a video frame capture module 230-a and/or a video timer module 235-a.

The audio processing unit 150-*d* may include an audio frame capture module 230-*b* and/or an audio timer module 235-*b*. The audio timer module 235-*b* may be in communication with the video timer module 235-*a*.

The UE 115-*c* may include a video display 320, a receive modem 325, an audio speaker 330, and/or an AV synchronization module 335. The UE 115-*c* may receive audio and video streams (e.g., RTP streams) at the receive modem 325 from the audio processing unit 150-*d* and the video processing unit 150-*c* via the network 130-*b*. In some embodiments, UE 115-*c* is configured for AV synchronization such that the received audio and video streams are synchronized. This AV synchronization may occur at or within the AV synchronization module 335, which may feed synchronized audio and video streams to the audio speaker 330 and the video display 320, respectively.

By way of example, a reference time at a clock rate of the audio timer module 235-*b* is selected. The reference time may then be mapped to a clock rate at the video processing unit 150-*c* (e.g., to the clock rate of the video timer module 235-*a* and/or to the video frame capture module 230-*a*). The video frame capture module 230-*a* may capture a video frame from the video input 310. The video input 310 may be associated with a camera. The video processing unit 230-*a*, through the video frame capture module 230-*a*, may record a first timestamp of the video frame capture by reference at the clock rate of the video timer module 235-*a*. Then, the video processing unit 150-*c*, through the video frame capture module 230-*a*, may determine a video capture time based on the reference time and the recorded first timestamp. The determined video capture time may thus be understood by reference to the clock rate of the audio timer module 235-*b* (e.g., the clock associated with the audio capture). The video processing unit 150-*c* may then transmit the captured video frame and the video capture time to the UE 115-*c* via the network 130-*b*, which, in some embodiments, is a packet switched network.

Concurrently, the audio frame capture module 230-*b* may capture an audio frame from the audio input 305. The audio input 305 may be associated with a microphone. In some cases, the captured audio frame relates to the captured video frame, such that the video and audio frames occurred at the same point in real time. In other words, a camera associated with the video input 310 and a microphone associated with the audio input 305 respectively gathered visual and audio data associated with the same event. The audio processing unit 150-*d*, through the audio frame capture module 230-*b*, may record a timestamp of the audio frame capture by reference to the audio timer module 235-*b* (e.g., the first clock rate). The audio processing unit 150-*d* may then transmit the captured audio frame and the audio frame timestamp to the UE 115-*c* via the network 130-*b*.

In accordance with some embodiments, the video display module 320 may display video based on the captured video frame; and the audio speaker 330 may play audio based on the captured audio frame. The UE 115-*c* may perform AV synchronization, e.g., with the AV synchronization module 335, by utilizing the determined video capture time and the audio frame timestamp, both of which are measurements with respect to the first clock rate (e.g., the clock of the audio processing unit 150-*d*, the audio timer module 235-*b*).

As used herein, clock rates may be functions of a processing unit or units (or a processor or processors) to the extent that the clock rates may be based on clock speeds, timers, processing speeds, processes, frequencies, oscillators, crystals, sampling rates, and the like, of a given processor or processing unit. While the discussion of clock rates is generally described with reference to multiple processing units, those skilled in the art will recognize the first and second clock rates could be functions of a common processing unit. For example, the video processing unit 150-*c* and the audio processing unit 150-*d* may be aspects of a common processing unit. Or, each processing unit may be discrete, and the video processing unit 150-*c* and the audio processing unit 150-*d* may be a video processor and an audio processor, respectively.

In some cases, the selected reference time may be updated, either periodically or non-periodically, and re-mapped from the audio processing unit 150-*d* to the video processing unit 150-*c*. For example, the selected reference time may be updated periodically. In some cases, this periodic update occurs every twenty (20) milliseconds. In this way, the video timer module 235-*a* (e.g., the clock of the video processing unit 150-*c*) does not drift with respect to the audio timer module 235-*b* (e.g., the clock of the audio processing unit 150-*d*).

According to some embodiments, a determined capture time $T_{mc}$ (e.g., the determined capture time of a video frame) may be represented as:

$$T_{mc} = T_m + (t_{ac} - t_a) + D_d, \quad (1)$$

where $T_m$ represents a reference time (e.g., a time of the audio processing unit 150-*c* clock), $t_a$ represents a mapped reference time (e.g., the time of the audio processing unit 150-*d* clock mapped to the video processing unit 150-*c*), $t_{ac}$ represents a recorded timestamp of a frame capture (e.g., a video frame capture at the video frame capture module 230-*a*), and $D_d$ represents a propagation delay associated with mapping the reference time from one processing unit to the other.

Those skilled in the art will recognize that the clock, or clock rate, of either processing unit may be selected as a reference time. Thus, in the described example, the respective roles of the audio and video processing units may be reversed. Furthermore, the skilled artisan will note that the described tools and techniques may apply equally to timestamps associated with RTP and RTCP. Thus, Equation 1 may be applied to either RTP or RTCP, or both.

Figure 4:
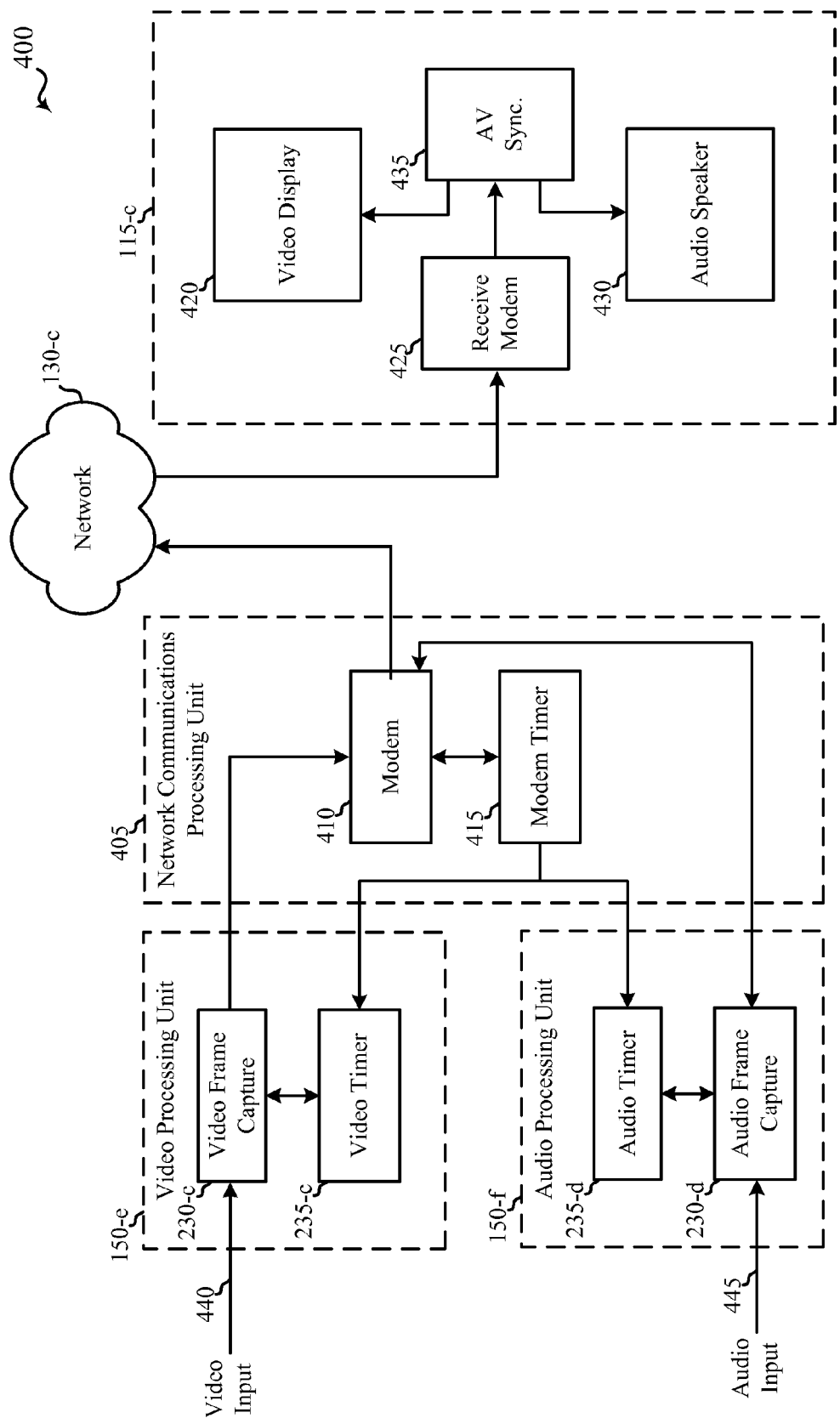
FIG. 4 shows a block diagram of an example communications system in accordance with some embodiments.

Next, referring to FIG. 4, a block diagram illustrates a system 400 configured for AV synchronization. The system 400 may be an example of aspects of the systems 100, 100-*a*, and/or 300 of FIGS. 1A, 1B, and 3. The system 400 may include aspects of the devices 200 and 200-*a* of FIGS. 2A and 2B. The system 400 may include a UE 115-*d*, a network 130-*c*, a video processing unit 150-*e*, an audio processing unit 150-*f*, and/or a network communications processing unit 405. For example, the UE 115-*d* may be an example of the UEs 115 described with reference to FIGS. 1A, 1B, 2A, and/or 2B. The network 130-*b* may be an example of the network 130 described with reference to FIGS. 1A and 1B. The video processing unit 150-*c* and the audio processing unit 150-*d* may be examples of AV devices 150 described with reference FIGS. 1B, 2A, and/or 2B.

The video processing unit 150-*e* may include a video frame capture module 230-*c* and/or a video timer module 235-*c*. The audio processing unit 150-*f* may include an audio frame capture module 230-*d* and/or an audio timer module 235-*d*. The audio timer module 235-*d* may be in communication with the video timer module 235-*c*.

The UE 115-*d* may include a video display 420, a receive modem 425, an audio speaker 430, and/or an AV synchronization module 435. The UE 115-*d* may receive audio and video streams (e.g., RTP streams) at the receive modem 425 from the audio processing unit 150-*f* and the video processing unit 150-*e* via the network 130-*c*. In some embodiments, UE 115-*d* is configured for AV synchronization such that the received audio and video streams are synchronized. In some embodiments, AV synchronization occurs at or within the AV synchronization module 335, which may feed synchronized audio and video streams to the audio speaker 430 and the video display 420, respectively.

The network communications processing unit 405 may include a modem module 410 and/or a modem timer module 415.

By way of example, a reference time at a clock rate of the modem timer module 415, is selected. The reference time may then be mapped to a clock rate at the video processing unit 150-*e* (e.g., a clock rate of the video timer module 235-*c* and/or to the video frame capture module 230-*c*). The video frame capture module 230-*c* may capture a video frame from the video input 440. The video input 440 may be associated with a camera. The video processing unit 150-*e*, through the video frame capture module 230-*c*, may record a video timestamp of the video frame capture by reference to the clock rate of the video timer module 235-*c*. Then, the video processing unit 150-*e*, through the video frame capture module 230-*c*, may determine a video capture time based on the reference time and the recorded video timestamp. The determined video capture time may thus be understood by reference to the clock rate of the modem timer module 415 (e.g., the clock associated with the modem module 410). The video processing unit 150-*e* may then transmit the captured video frame and the video capture time to the UE 115-*d* via the network 130-*c* by way of the modem module 410.

Concurrently, The reference time may be mapped to the clock rate at the audio processing unit 150-*f* (e.g., the clock rate of the audio timer module 235-*d* and/or to the audio frame capture module 230-*d*). The audio frame capture module 230-*d* may capture an audio frame from an audio input 445. The audio input 445 may be associated with a microphone. The audio processing unit 150-*f*, through the audio frame capture module 230-*d*, may record an audio timestamp of the audio frame capture by reference to the clock rate of the audio timer module 235-*d*. Then, the audio processing unit 150-*f*, through the audio frame capture module 230-*d*, may determine an audio capture time based on the reference time and the recorded audio timestamp. The determined audio capture time likewise may be understood by reference to the clock rate of the modem timer module 415 (e.g., the clock associated with the modem module 410). The audio processing unit 150-*f* may then transmit the captured audio frame and the audio capture time to the UE 115-*d* via the network 130-*c* by way of the modem 410.

Again, with reference to FIG. 4, the discussion of clock rates is generally described with reference to multiple processing units, those skilled in the art will recognize the first and second clock rates could be functions of a common processing unit. For example, the video processing unit 150-*c* and the audio processing unit 150-*d* may be aspects of a common processing unit. Or, each processing unit may be discrete, and the video processing unit 150-*c* and the audio processing unit 150-*d* may be a video processor and an audio processor, respectively.

In accordance with some embodiments, the video display module 420 may display video based on the captured video frame; and the audio speaker 430 may play audio based on the captured audio frame. The UE 115-*d* may perform AV synchronization, e.g., with the AV synchronization module 435, by utilizing the determined video capture time and the determined audio frame capture, both of which are measurements with respect to the modem timer module 415 (e.g., the clock of the network communications processing unit 405).

Figure 5:
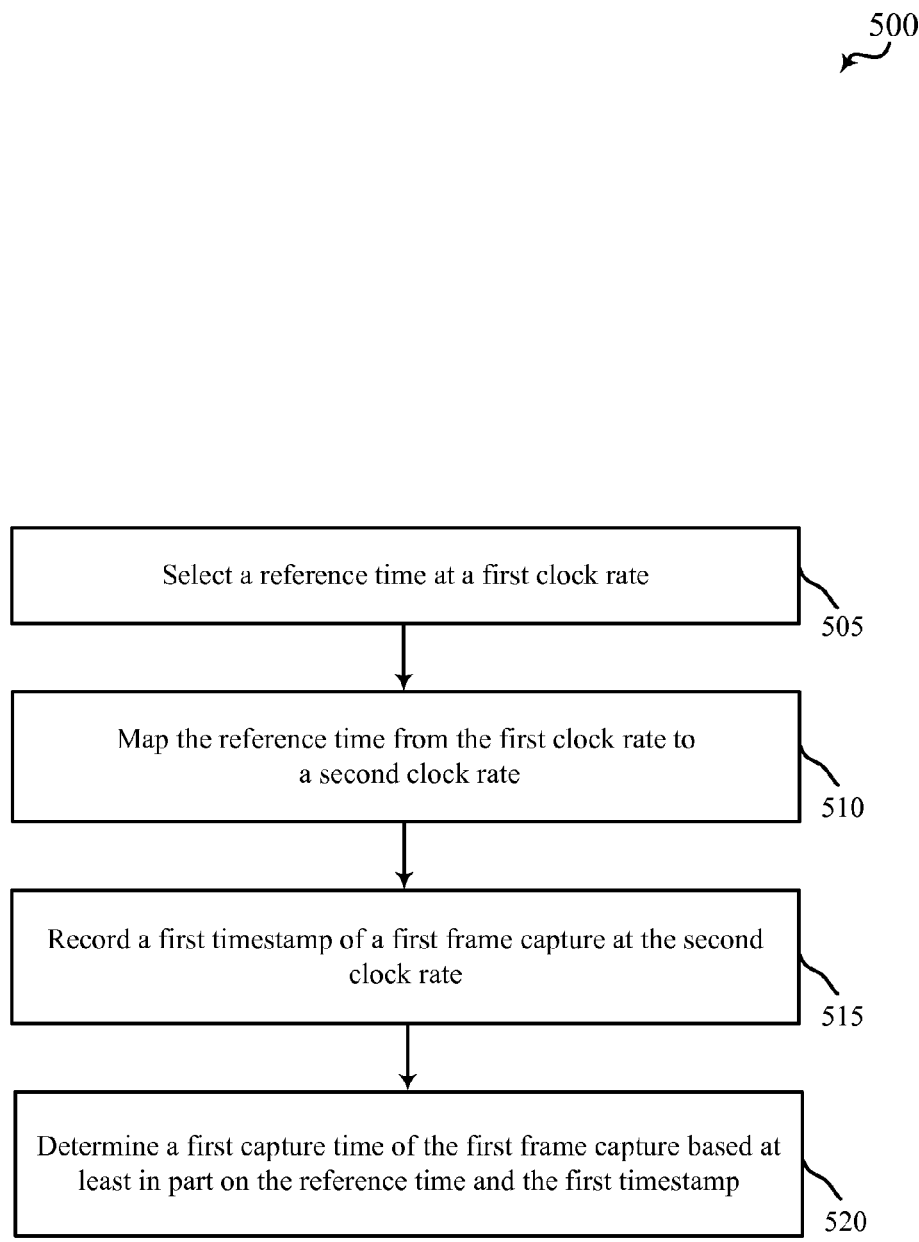
FIG. 5 is a flowchart of a method of audiovisual synchronization in accordance with some embodiments.

Next, FIG. 5 shows a flowchart of a method 500 of media synchronization in accordance with some embodiments. The method may be implemented using one or more aspects of the systems 100, 100-*a*, 300, and 400 of FIGS. 1A, 1B, 3, and 4 and the devices 200 and 200-*a* of FIGS. 2A and 2B.

At block 505, the method may include selecting a reference time at a first clock rate. The operations at block 505 may be performed by the timer module 235 of FIG. 2B, the video timer module 235-*a* of FIG. 3, the audio timer module 235-*b* of FIG. 3, and/or the modem timer module 415 of FIG. 4. The first and second clock rates may be functions of a common processing unit. Alternatively, the first and second clock rates may be functions of a first and second processing unit, respectively. In some cases, the first and second processing units are each an audio or video processor.

At block 510, the method may involve mapping the reference time from the first clock rate to a second clock rate. The operations at block 510 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

At block 515, the method may involve recording a first timestamp of a first frame capture at the second clock rate. The operations at block 515 may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 520, the method may include determining a first capture time based at least in part on the reference time and the first timestamp. The operations at block 520 may be performed by may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

Figure 6:
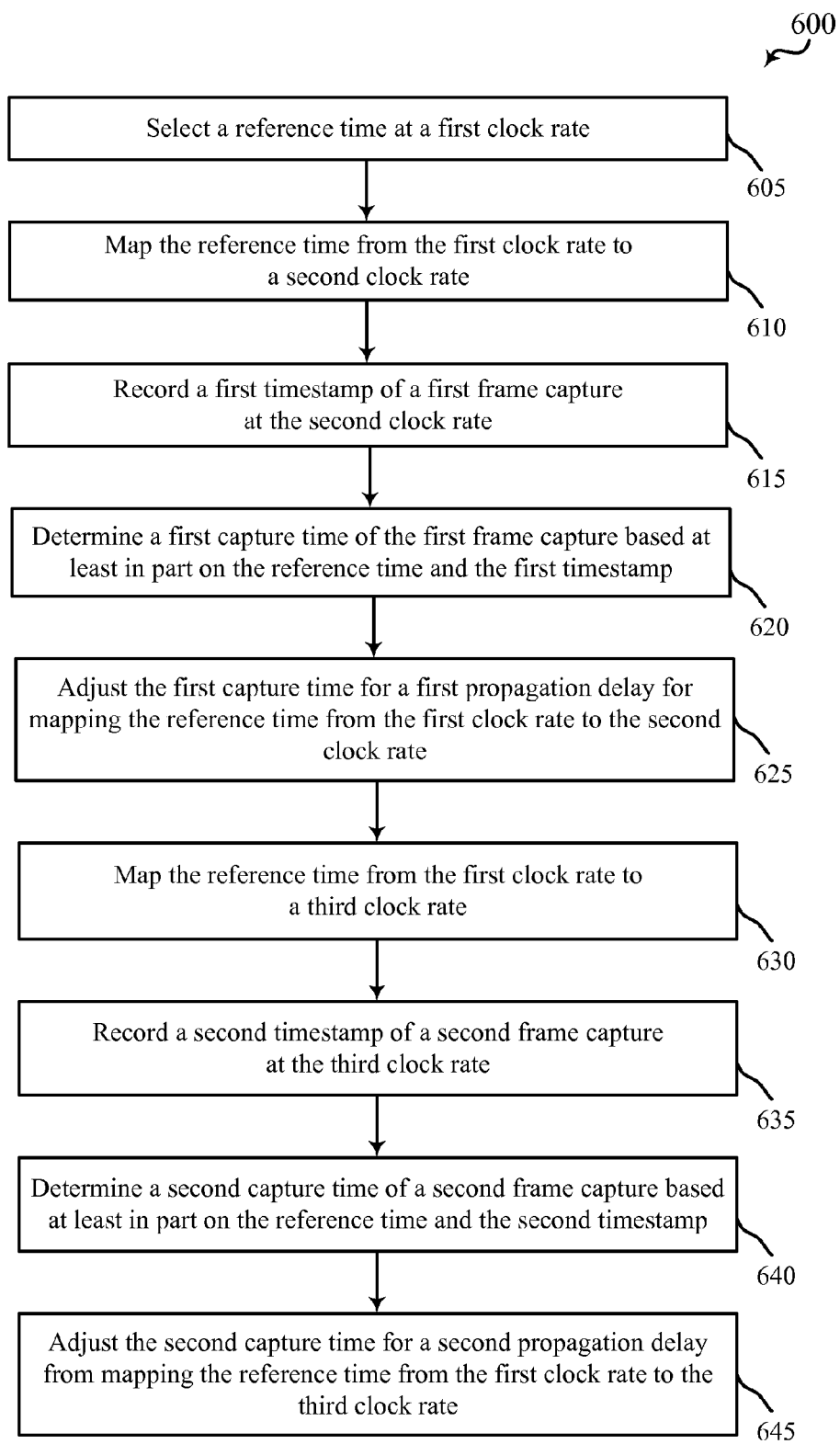
FIG. 6 is a flowchart of a method of audiovisual synchronization in accordance with some embodiments.

Turning next to FIG. 6, which depicts a flowchart of a method 600 of media synchronization in accordance with some embodiments. The method may be implemented using one or more aspects of the systems 100, 100-*a*, 300, and 400 of FIGS. 1A, 1B, 3, and 4 and the devices 200 and 200-*a* of FIGS. 2A and 2B.

At block 605, the method may include selecting a reference time at a first clock rate. The operations at block 605 may be performed by the timer module 235 of FIG. 2B, the video timer module 235-*a* of FIG. 3, the audio timer module 235-*b* of FIG. 3, and/or the modem timer module 415 of FIG. 4.

At block 610, the method may involve mapping the reference time from the first clock rate to a second clock rate. The operations at block 610 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

At block 615, the method may involve recording a first timestamp of a first frame capture at the second clock rate. The operations at block 615 may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 620, the method may include determining a first capture time based at least in part on the reference time and the first timestamp. The operations at block 620 may be performed by may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 625, the method may include adjusting the first capture time for a first propagation delay for mapping the reference time from the first clock rate to the second clock rate. The operations at block 625 may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 630, the method may include mapping the reference time from the first clock rate to a third clock rate. The operations at block 630 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

At block 635, the method may involve recording a second timestamp of a second frame capture a the third clock rate. The operations at block 635 may be performed by may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 640, the method may include determining a second capture time of a second frame capture based at least in part on the reference time and the second timestamp. The operations at block 640 may be performed by may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 645, the method may involve adjusting the second capture time for a second propagation delay from mapping the reference time from the first clock rate to the third clock rate. The operations at block 645 may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

In the method 600, the first, second, and third clock rates may be functions of a common processor. Alternatively, the first, second, and/or third clock rates may be functions of a first, second, and/or third processing unit, respectively. In some embodiments, the first processing unit is a modem and the second and third processing units are audio or video processors.

Figure 7:
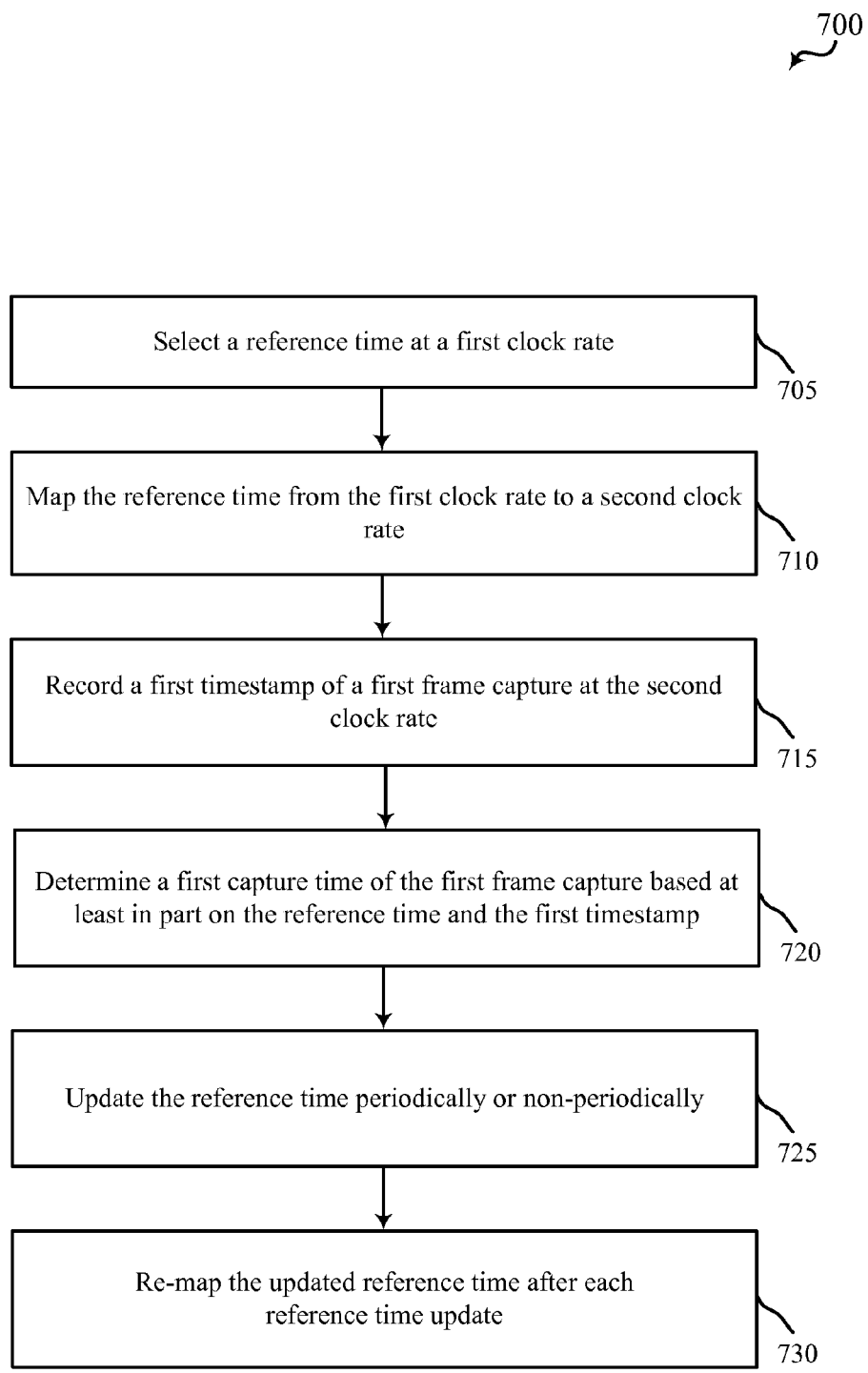
FIG. 7 is a flowchart of a method of audiovisual synchronization in accordance with some embodiments.

Now, referring to FIG. 7, a flowchart depicts a method 700 of media synchronization in accordance with some embodiments. The method may be implemented using one or more aspects of the systems 100, 100-*a*, 300, and 400 of FIGS. 1A, 1B, 3, and 4 and the devices 200 and 200-*a* of FIGS. 2A and 2B.

At block 705, the method may include selecting a reference time at a first clock rate. The operations at block 705 may be performed by the timer module 235 of FIG. 2B, the video timer module 235-*a* of FIG. 3, the audio timer module 235-*b* of FIG. 3, and/or the modem timer module 415 of FIG. 4. The first and second clock rates may be functions of a common processing unit. Alternatively, the first and second clock rates may be functions of a first and second processing unit, respectively.

At block 710, the method may involve mapping the reference time from the first clock rate to a second clock rate. The operations at block 710 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

At block 715, the method may involve recording a first timestamp of a first frame capture at the second clock rate. The operations at block 715 may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 720, the method may include determining a first capture time based at least in part on the reference time and the first timestamp. The operations at block 720 may be performed by may be implemented by the frame capture module 230 of FIG. 2B, the video frame capture module 230-*a* of FIG. 3, the audio frame capture module 230-*b* of FIG. 3, the video frame capture module 230-*c* of FIG. 4, and/or the audio frame capture module 230-*d* of FIG. 4.

At block 725, the method may include updating the reference time periodically or non-periodically. The operations at block 725 may be performed by the timer module 235 of FIG. 2B, the video timer module 235-*a* of FIG. 3, the audio timer module 235-*b* of FIG. 3, and/or the modem timer module 415 of FIG. 4. The first and second clock rates may be functions of a common processing unit. Alternatively, the first and second clock rates may be functions of a first and second processing unit, respectively.

At block 730, the method may involve re-mapping the updated reference time after each reference time update. The operations at block 730 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

Figure 8:
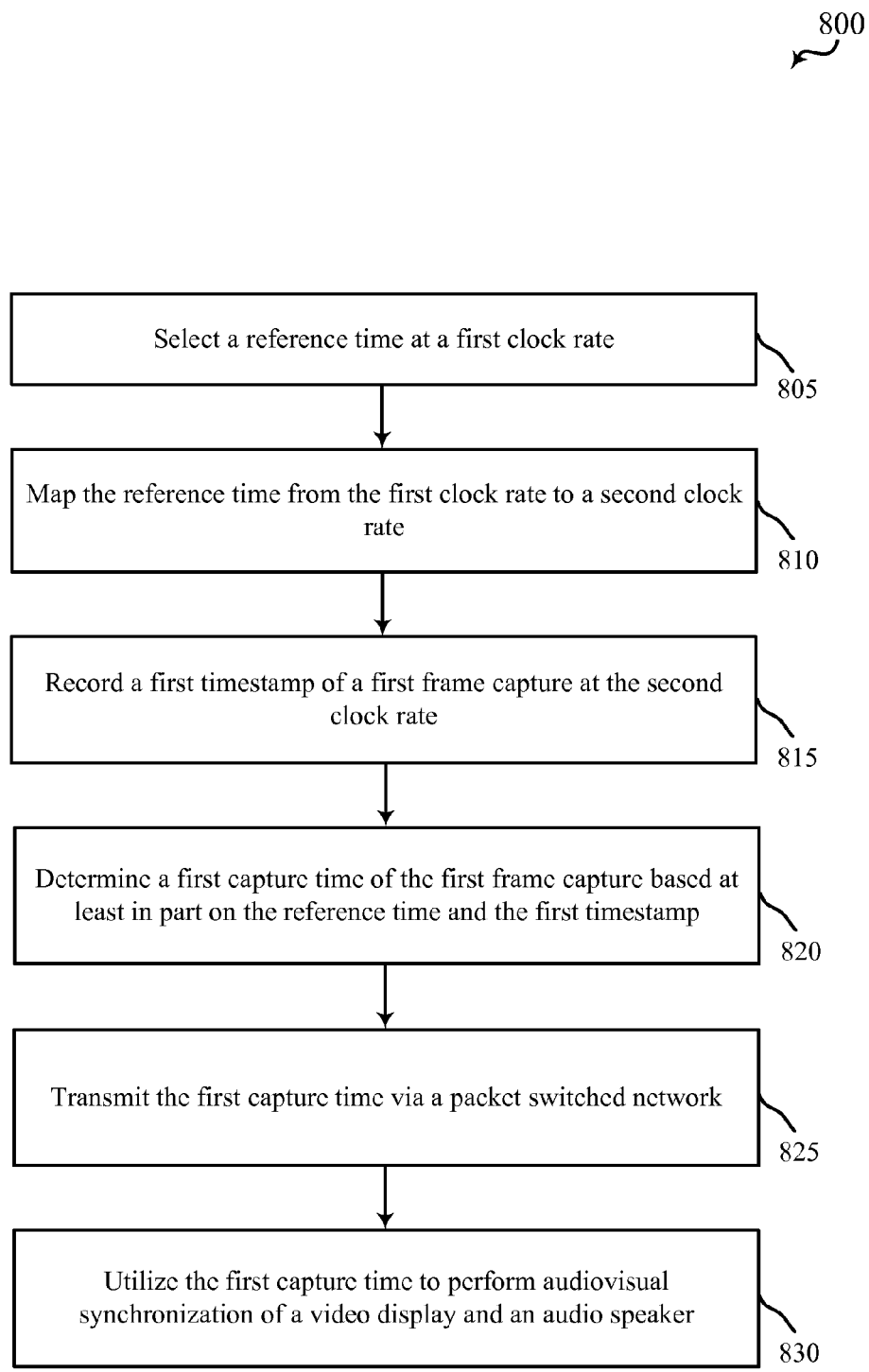
FIG. 8 is a flowchart of a method of audiovisual synchronization in accordance with some embodiments.

Turning now to FIG. 8, which depicts a flowchart of a method 800 of media synchronization in accordance with some embodiments. The method may be implemented using one or more aspects of the systems 100, 100-*a*, 300, and 400 of FIGS. 1A, 1B, 3, and 4 and the devices 200 and 200-*a* of FIGS. 2A and 2B.

At block 805, the method may include selecting a reference time at a first clock rate. The operations at block 805 may be performed by the timer module 235 of FIG. 2B, the video timer module 235-*a* of FIG. 3, the audio timer module 235-*b* of FIG. 3, and/or the modem timer module 415 of FIG. 4. The first and second clock rates may be functions of a common processing unit. Alternatively, the first and second clock rates may be functions of a first and second processing unit, respectively.

At block 810, the method may involve mapping the reference time from the first clock rate to a second clock rate. The operations at block 810 may be implemented by the timer module 235 of FIG. 2B, the video timer module 235-*a* of FIG. 3, the audio timer module 235-*b* of FIG. 3, the video timer module 235-*c* of FIG. 4, the audio timer module 235-*d* of FIG. 4, and/or the modem timer module 415 of FIG. 4.

At block 815, the method may involve recording a first timestamp of a first frame capture at the second clock rate. The operations at block 815 may be implemented by the frame capture module 230 of FIG. 2B, the video frame capture module 230-a of FIG. 3, the audio frame capture module 230-b of FIG. 3, the video frame capture module 230-c of FIG. 4, and/or the audio frame capture module 230-d of FIG. 4.

At block 820, the method may include determining a first capture time based at least in part on the reference time and the first timestamp. The operations at block 820 may be performed by may be implemented by the frame capture module 230 of FIG. 2B, the video frame capture module 230-a of FIG. 3, the audio frame capture module 230-b of FIG. 3, the video frame capture module 230-c of FIG. 4, and/or the audio frame capture module 230-d of FIG. 4.

At block 825, the method may include transmitting the first capture time via a packet switched network. The operations of block 825 may be performed by the transmitter modules 215 of FIGS. 2A and 2B, the AV processing units 150 of FIG. 3, and/or the modem module 410 of FIG. 4.

At block 830, the method may include utilizing the first capture time to perform audiovisual synchronization of a video display and an audio speaker. The operations of block 830 may be performed by the AV synchronization module 335 of FIG. 3 and/or the AV synchronization module 435 of FIG. 4.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description below, although the techniques are applicable beyond LTE applications.

Thus, the description set forth above provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of media synchronization at a second processing unit, comprising:
   receiving a reference time associated with a first clock rate of a first processing unit;
   mapping the reference time directly from the first clock rate to a second clock rate of the second processing unit to obtain a mapped reference time based at least in part on receiving the reference time, wherein the first and second clock rates are different;
   recording a first timestamp of a first frame capture at the second clock rate at the second processing unit;
   determining a difference between the mapped reference time and the recorded first timestamp;
   determining a first capture time of the first frame capture as a function of the first clock rate based at least in part on the received reference time and the determined difference; and
   determining a second capture time of a second frame capture based at least in part on the received reference time, the mapped reference time, and a second timestamp recorded at the second clock rate at the second processing unit.

2. The method of claim 1, further comprising:
   adjusting the first capture time for a first propagation delay for mapping the reference time from the first clock rate to the second clock rate.

3. The method of claim 1, wherein the first clock rate and the second clock rate are functions of a common processing unit that comprises the first and second processing units.

4. The method of claim 1, wherein the first processing unit and the second processing unit each comprise one of an audio processor or a video processor.

5. The method of claim 1, further comprising:
   mapping the reference time from the first clock rate to a third clock rate of a third processing unit to obtain a second mapped reference time based at least in part on receiving the reference time, wherein the third and first clock rates are different;
   recording a third timestamp of a third frame capture at the third clock rate at the third processing unit; and
   determining a third capture time of the third frame capture based at least in part on the received reference time, the second mapped reference time, and the third timestamp.

6. The method of claim 5, further comprising:
   adjusting the third capture time for a second propagation delay for mapping the reference time from the first clock rate to the third clock rate.

7. The method of claim 5, wherein the first clock rate, the second clock rate, and the third clock rate are functions of a common processing unit that comprises the first, second, and third processing units.

8. The method of claim 5, wherein the first processing unit comprises a modem and the second processing unit and the third processing unit each comprise one of an audio processor or a video processor.

9. The method of claim 1, further comprising:
   updating the reference time periodically.

10. The method of claim 9, further comprising:
    re-mapping the updated reference time after each reference time update.

11. The method of claim 1, further comprising:
    updating the reference time non-periodically.

12. The method of claim 11, further comprising:
    re-mapping the updated reference time after each reference time update.

13. The method of claim 1, further comprising:
    transmitting the first capture time and the second capture time via a packet switched network.

14. The method of claim 1, further comprising:
    utilizing the first capture time to perform audiovisual synchronization of a video display and an audio speaker.

15. A system for media synchronization at a second processing unit, comprising:
    means for receiving a reference time associated with a first clock rate of a first processing unit;
    means for mapping the reference time directly from the first clock rate to a second clock rate of the second processing unit to obtain a mapped reference time based at least in part on receiving the reference time, wherein the first and second clock rates are different;
    means for recording a first timestamp of a first frame capture at the second clock rate at the second processing unit;
    means for determining a difference between the mapped reference time and the recorded first timestamp;
    means for determining a first capture time of the first frame capture as a function of the first clock rate based at least in part on the received reference time and the determined difference; and
    means for determining a second capture time of a second frame capture based at least in part on the received reference time, the mapped reference time, and a second timestamp recorded at the second clock rate at the second processing unit.

16. The system of claim 15, further comprising:
    means for adjusting the first capture time for a first propagation delay for mapping the reference time from the first clock rate to the second clock rate.

17. The system of claim 15, wherein the first clock rate and the second clock rate are functions of a common processing unit that comprises the first and second processing units.

18. The system of claim 15, wherein the first processing unit and the second processing unit each comprise one of an audio processor or a video processor.

19. The system of claim 15, further comprising:
    means for mapping the reference time from the first clock rate to a third clock rate of a third processing unit to obtain a second mapped reference time based at least in part on receiving the reference time, wherein the third and first clock rates are different;

means recording a third timestamp of a third frame capture at the third clock rate at the third processing unit; and means for determining a third capture time of the third frame capture based at least in part on the received reference time, the second mapped reference time, and the third timestamp.

20. The system of claim 19, further comprising:
means for adjusting the third capture time for a second propagation delay for mapping the reference time from the first clock rate to the third clock rate.

21. The system of claim 19, wherein the first clock rate, the second clock rate, and the third clock rate are functions of a common processing unit that comprises the first, second, and third processing units.

22. The system of claim 19, wherein the first processing unit comprises a modem and the second processing unit and the third processing unit each comprise one of an audio processor or a video processor.

23. The system of claim 15, further comprising:
means for updating the reference time periodically.

24. The system of claim 23, further comprising:
means for re-mapping the updated reference time after each reference time update.

25. The system of claim 15, further comprising:
means for updating the reference time non-periodically.

26. The system of claim 25, further comprising:
means for re-mapping the updated reference time after each reference time update.

27. The system of claim 15, further comprising:
means for transmitting the first capture time and the second capture time via a packet switched network.

28. The system of claim 15, further comprising:
means for utilizing the first capture time to perform audio-visual synchronization of a video display and an audio speaker.

29. An apparatus for media synchronization at a second processing unit, comprising:
a processor;
memory in electronic communication with the processor, the memory embodying instructions, the instructions being executable by the processor to:
receive a reference time associated with a first clock rate of a first processing unit;
map the reference time directly from the first clock rate to a second clock rate of the second processing unit to obtain a mapped reference time based at least in part on receiving the reference time, wherein the first and second clock rates are different;
record a first timestamp of a first frame capture at the second clock rate at the second processing unit;
determine a difference between the mapped reference time and the recorded first timestamp;
determine a first capture time of the first frame capture as a function of the first clock rate based at least in part on the received reference time and the determined difference; and
determine a second capture time of a second frame capture based at least in part on the received reference time, the mapped reference time, and a second timestamp recorded at the second clock rate at the second processing unit.

30. The apparatus of claim 29, wherein the instructions are executable by the processor to:
adjust the first capture time for a first propagation delay for mapping the reference time from the first clock rate to the second clock rate.

31. The apparatus of claim 29, wherein the first clock rate and the second clock rate are functions of a common processing unit that comprises the first and second processing units.

32. The apparatus of claim 29, wherein the first processing unit and the second processing unit each comprise one of an audio processor or a video processor.

33. The apparatus of claim 29, wherein the instructions are executable by the processor to:
map the reference time from the first clock rate to a third clock rate of a third processing unit to obtain a second mapped reference time based at least in part on receiving the reference time, wherein the third and first clock rates are different;
record a third timestamp of a third frame capture at the third clock rate at the third processing unit; and
determine a third capture time of the third frame capture based at least in part on the received reference time, the second mapped reference time, and the third timestamp.

34. The apparatus of claim 33, wherein the instructions are executable by the processor to:
adjust the third capture time for a second propagation delay for mapping the reference time from the first clock rate to the third clock rate.

35. The apparatus of claim 33, wherein the first clock rate, the second clock rate, and the third clock rate are functions of a common processing unit that comprises the first, second, and third processing units.

36. The apparatus of claim 33, wherein the first processing unit comprises a modem and the second processing unit and the third processing unit each comprise one of an audio processor or a video processor.

37. The apparatus of claim 29, wherein the instructions are executable by the processor to:
update the reference time periodically.

38. The apparatus of claim 37, wherein the instructions are executable by the processor to:
re-map the updated reference time after each reference time update.

39. The apparatus of claim 29, wherein the instructions are executable by the processor to:
update the reference time non-periodically.

40. The apparatus of claim 39, wherein the instructions are executable by the processor to:
re-map the updated reference time after each reference time update.

41. The apparatus of claim 29, wherein the instructions are executable by the processor to:
transmit the first capture time and the second capture time via a packet switched network.

42. The apparatus of claim 29, wherein the instructions are executable by the processor to:
utilize the first capture time to perform audiovisual synchronization of a video display and an audio speaker.

43. A computer-program product for media synchronization at a second processing unit, comprising a non-transitory computer-readable medium storing instructions executable by a processor to:
receive a reference time associated with a first clock rate of a first processing unit;
map the reference time directly from the first clock rate to a second clock rate of the second processing unit to obtain a mapped reference time based at least in part on receiving the reference time, wherein the first and second clock rates are different;
record a first timestamp of a first frame capture at the second clock rate at the second processing unit;

determine a difference between the mapped reference time and the recorded first timestamp;

determine a first capture time of the first frame capture as a function of the first clock rate based at least in part on the received reference time and the determined difference; and determine a second capture time of a second frame capture based at least in part on the received reference time, the mapped reference time, and a second timestamp recorded at the second clock rate at the second processing unit.

44. The computer-program product of claim 43, wherein the instructions are executable by the processor to:

adjust the first capture time for a first propagation delay for mapping the reference time from the first clock rate to the second clock rate.

45. The computer-program product of claim 43, wherein the first clock rate and the second clock rate are functions of a common processing unit that comprises the first and second processing units.

46. The computer-program product of claim 43, wherein the first processing unit and the second processing unit each comprise one of an audio processor or a video processor.

47. The computer-program product of claim 43, wherein the instructions are executable by the processor to:

map the reference time from the first clock rate to a third clock rate of a third processing unit to obtain a second mapped reference time based at least in part on receiving the reference time, wherein the third and first clock rates are different;

record a third timestamp of a third frame capture at the third clock rate at the third processing unit; and determine a third capture time of the third frame capture based at least in part on the received reference time, the second mapped reference time, and the third timestamp.

48. The computer-program product of claim 47, wherein the instructions are executable by the processor to:

adjust the third capture time for a second propagation delay for mapping the reference time from the first clock rate to the third clock rate.

49. The computer-program product of claim 47, wherein the first clock rate, the second clock rate, and the third clock rate are functions of a common processing unit that comprises the first, second, and third processing units.

50. The computer-program product of claim 47, wherein the first processing unit comprises a modem and the second processing unit and the third processing unit each comprise one of an audio processor or a video processor.

51. The computer-program product of claim 43, wherein the instructions are executable by the processor to:

update the reference time periodically.

52. The computer-program product of claim 51, wherein the instructions are executable by the processor to:

re-map the updated reference time after each reference time update.

53. The computer-program product of claim 43, wherein the instructions are executable by the processor to:

update the reference time non-periodically.

54. The computer-program product of claim 53, wherein the instructions are executable by the processor to:

re-map the updated reference time after each reference time update.

55. The computer-program product of claim 43, wherein the instructions are executable by the processor to:

transmit the first capture time and the second capture time via a packet switched network.

56. The computer-program product of claim 43, wherein the instructions are executable by the processor to:

utilize the first capture time to perform audiovisual synchronization of a video display and an audio speaker.

* * * * *